April 27, 1943.  J. M. TYLER  2,317,501
FRICTION DAMPED ENGINE MOUNT
Filed March 21, 1941
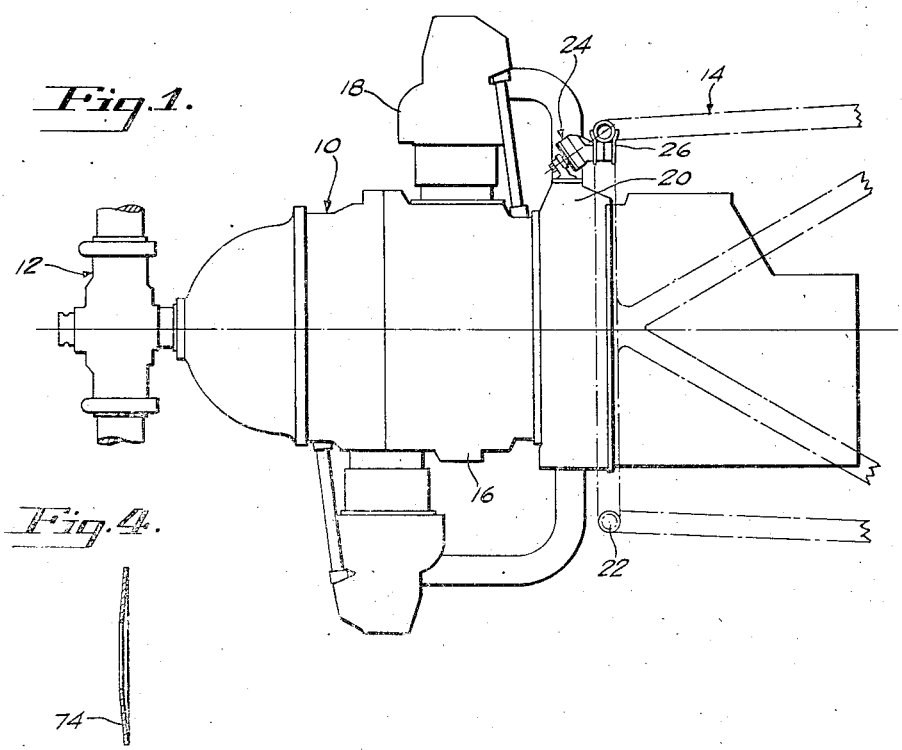
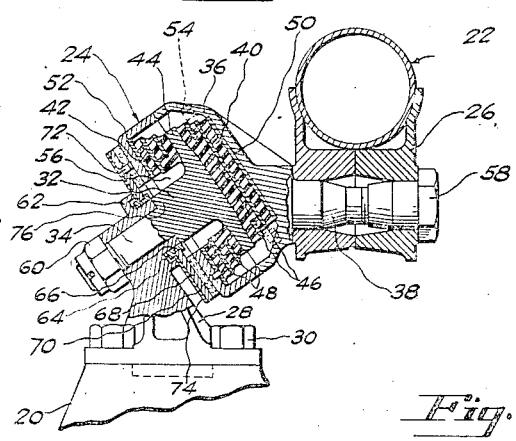
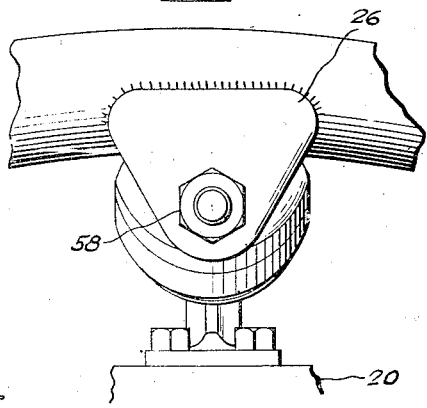
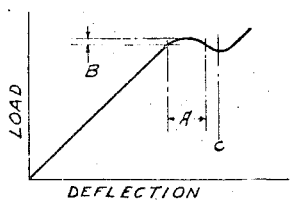
INVENTOR
John M. Tyler
BY Harris G. Luther
ATTORNEY Patented Apr. 27, 1943

2,317,501

UNITED STATES PATENT OFFICE 2,317,501

FRICTION DAMPED ENGINE MOUNT

John M. Tyler, West Hartford, Conn., assignor to United Aircraft Corporation, East Hartford, Conn., a corporation of Delaware Application March 21, 1941, Serial No. 384,543

2 Claims. (Cl. 248—5)

This invention relates to improvements in engine suspension means and has particular reference to an improved mount for the engine of a vehicle such as an airplane.

An object of the invention resides in the provision of an improved vehicle engine suspension means incorporating resilient connecting means and frictional damping therein which can be modified to suppress the vibration of the power plant with respect to the airplane at speeds where the exiting forces applied to the power plant are in resonance with natural frequencies of vibration of the power plant with respect to the airplane.

Other objects and advantages will be more particularly pointed out hereinafter or will become apparent as the description proceeds.

In the accompanying drawing, in which like reference numerals are used to designate similar parts throughout, there is illustrated a suitable mechanical embodiment for the purpose of disclosing the invention. The drawing, however, is for the purpose of illustration only and is not to be taken as limiting or restricting the invention since it will be apparent to those skilled in the art that various changes in the illustrated embodiment may be resorted to without in any way exceeding the scope of the invention.

In the drawing, Fig. 1 is a somewhat diagrammatic view of an aircraft engine and engine support showing the application thereto of engine mount units constructed according to the invention.

Fig. 2 is a longitudinal sectional view through an engine mount bracket constructed according to the invention.

Fig. 3 is an end elevational view of the engine mount bracket shown in section in Fig. 2.

Fig. 4 is a transverse sectional view of a conical spring constituting one of the elements of the brackets shown in Fig. 2, and Fig. 5 is a graph illustrating the load-deflection characteristics of the spring used to maintain pressure on the frictional damping portion of the device.

It is a well known fact that a mass such as an aircraft power plant flexibly suspended from a support such as an airplane structure is capable of several modes of vibration with respect to the airplane. These vibrations are excited by forces originating within the power plant and by aerodynamic forces applied to the power plant. When the frequency of an excitation is equal to the natural frequency of a mode of vibration excited by that excitation resonance exists and relatively large amplitudes of vibration are produced. The amplitude of this vibration is a function of the amount of energy dissipated in damping as a result of the vibratory motion. It is obvious that the vibration is detrimental since it produces high stresses in the airplane structure and in all of the connections and controls extending from the airplane to the engine.

It is possible to reduce the amplitude of vibration at these conditions of resonance by introducing damping in the form of friction resisting the motion of the power plant with respect to the airplane. The energy dissipated in the form of damping must equal the work done by the exciting forces producing the vibration. However, as the friction forces resisting the vibratory motion are increased the amplitude of vibration is reduced and the work done by the exciting forces is thereby reduced. Thus, by the introduction of friction into the flexible power plant suspension system the amplitude of vibration at resonance is reduced and the energy dissipated in the form of damping is reduced.

Although the damping reduces the response of the power plant to the excitation applied to it at frequencies in the neighborhood of resonance, in fact throughout the range between zero frequency and the square root of two times the natural frequency, the damping is detrimental at frequencies above the square root of two times the natural frequency because it increases the transmission of vibration from the power plant to the airplane in this frequency range.

In theoretical studies of vibrating systems the damping is usually considered to involve viscous friction because it is extremely difficult to make a theoretical analysis for any other type of damping. Thus, practically all text books and articles published on the subject describe the relation between vibration transmission and damping in terms of viscous friction only.

In this invention solid or Coulomb friction is used. Coulomb friction has an appreciably different characteristic from that of viscous friction in that viscous friction force is directly proportional to the velocity while Coulomb friction force is independent of velocity. Thus, the detrimental effect of the transmission of vibration forces at high frequency through the friction damper which would be present if viscous friction were used are substantially absent when solid or Coulomb friction is used.

Another problem which has been solved in this invention involves the maintenance of a substantially constant value of Coulomb friction in all assemblies of friction damped engine mounting units in spite of tolerances on the dimensions of parts built in production and wear of the friction surfaces in service. The friction force resisting movement of the engine attached part of the mounting unit relative to the airplane attached part is equal to the coefficient of friction multiplied by the normal pressure exerted on the friction surfaces. With a conventional type of spring the spring load would be directly proportional to the spring deflection. The spring deflection is a function of the dimensional tolerances on several parts which compose the engine mount unit assembly. Wear on the friction surfaces would introduce additional changes in the deflection of the spring. However, a spring has been chosen which has a nonlinear characteristic and has been so arranged and so proportioned that its load-deflection curve is relatively flat in the range of deflections used to include the spring deflections encountered in production assemblies and production assemblies with wear experienced in service.

Referring to the drawing in detail, and particularly to Fig. 1, the numeral 10 generally indicates an air-cooled radial airplane engine and the numeral 12 generally indicates a propeller driven thereby, the engine and propeller constituting a power plant suspended from the mount generally indicated at 14. While a particular type of power plant and mount therefor has been illustrated in the accompanying drawing for convenience in disclosing the invention, it is to be understood that the invention is not limited to any particular type of power plant or mount but that it may be used in the suspension of any type of power plant to which its principles apply.

In the form of power plant illustrated, the engine has a generally cylindrical crankcase 16 carrying a plurality of radially disposed cylinders 18 and provided around one portion thereof with angularly spaced attaching points or pads 20 for the brackets disposed between the engine and the mounting ring 22, one of the brackets being generally indicated at 24. The mounting ring is provided with a plurality of apertured lugs 26 secured thereto by suitable means such as welding or brazing with the apertured portion of the lug inside of the ring, one lug 26 being provided opposite each bracket attaching pad 20 and one bracket 24 being interposed between each pad and the corresponding lug 26.

The bracket 26 may be of the general character particularly illustrated and described in my copending United States application Serial No. 279,717 filed June 17, 1939, for Fexible supports, and may each include a pedestal 28 secured to the corresponding crankcase pad by suitable means such as the cap screws 30, a headed core member 32 secured to the pedestal by a stem 34, a hollow housing 36 secured to the lug 26 by a suitable integral stem 38 and two bodies 40 and 42 of reinforced resilient material connecting the head 44 of the core member 32 with the end walls of the housing 36.

The resilient bodies 40 and 42 are bonded to respectively opposite surfaces of the head 44 and are reinforced by suitable thin metal inserts as indicated at 46 and 48 to increase their stiffness in compression. The body 40 is provided on its surface opposite the head 44 with an end plate 50 which fits within a recess in the portion of the housing 36 adjacent the stem 38 to locate the body in operative position in the housing while the body 42 is provided at its surface opposite the head 44 with an apertured end plate 52 which fits within the corresponding end of a separable part of the housing to maintain this body in operative position. The two parts of the housing 36 are secured together by suitable means such as the cap screws 54. The body 42 is apertured to provide an annular space 56 around the portion of the core member 32 extending through this body so that the core member may move freely in the housing resisted only by the shear and compression forces of the resilient bodies 40 and 42. It will be noticed that the diameter of the head 44 is less than the internal diameter of the adjacent portion of the housing 36 by an amount sufficient to permit this movement of the core members within the housing. The housing 36 is rigidly secured to the lug 26 by means of a nut 58 screw threaded onto the end of the stem 38 and the core member 32 is rigidly secured to the pedestal 28 by the stem 34 which passes through an aperture provided in the upper portion of the pedestal and by the nut 60 screw threaded on the end of the stem 34.

With this arrangement the engine may move relative to the ring 22 in all directions, its torsional or rotational movements relative to the ring being resisted by the bodies of resilient material acting in shear and its translational and angular movements being resisted by some or all of these bodies acting in compression. The resistance to these various movements can be controlled by designing the bodies of resilient material to have desired shear and compression resistance.

It has been found that the more important vibrational movements of a power plant, such as that illustrated in Fig. 1, can be damped by incorporating in each bracket damping means acting in parallel with the shear action of the resilient bodies in the bracket. One convenient manner of incorporating such damping means is particularly illustrated in Fig. 2 in which the pedestal member 28 is provided with an annular shoulder 62 surrounding and concentric with the aperture receiving the stem 34 and provided with an annular groove 64 on the housing side thereof receiving a bushing 66 provided with an external groove which receives the inner edge of an apertured plate 68 underlying the adjacent end of the housing 36 and carrying a ring 70 of frictional material secured to the plate by suitable means such as the rivets 72. The friction material 70 is pressed against the end surface of the housing by an apertured conical sspring 74 the inner portion of which rests upon the edge of the shoulder 62 surrounding the groove 64 and the outer portion of which bears against the adjacent surface of plate 68.

The spring 74 is a dished spring having when unloaded, a generally frustro-conical shape, as shown in Fig. 4 and a load-deflection characteristic as graphically illustrated in Fig. 5. The load-deflection curve shown in Fig. 5 indicates that the load-deflection characteristics of the spring has a substantially straight line function up to a certain point beyond which the curve flattens out indicating that considerable deflection can take place with a very slight change in load. This point is near the deflection value at which the spring has been rendered almost flat. Somewhat beyond the point at which the curve flattens out, the slope reverses and at C the spring is completely flattened. In this particular construction the spring cannot be deflected beyond C. A portion of the load-deflection curve indicated by the dimension A has been selected for the spring setting in the apparatus of this invention. This is accomplished by designing the mount unit in such a manner that the axial distance between the shoulder 62 and plate 68 is such as to deflect the spring to a deflection corresponding to the right hand end of the portion A of the load-deflection curve. Under these conditions, the spring deflection may be decreased a considerable amount by wear of the friction material or permissible tolerance in the dimensions of the parts, without material change in the loading. This means that with a spring of the type described in the manner indicated, any reasonable amount of wear of the friction material or permissible variation in the tolerances of the parts will not materially affect the pressure exerted by the spring forcing the friction material against the adjacent surface of the end of the housing 36 and that therefore, the frictional resistance to movement between the engine and the support remains substantially constant. When not under compression this spring member has the generally frustro-conical shape as particularly illustrated in Fig. 4 but is compressed by tightening the nut 60 to a condition in which it is substantially straight, as illustrated in Fig. 2. The amount of pressure exerted by this spring can be controlled by properly designing the length of the various parts including the core member 32 between the head 44 and the shoulder 76 which bears against the end of the aperture containing portion of the pedestal 28.

While a suitable mechanical embodiment has been hereinabove described and illustrated in the accompanying drawing for the purpose of disclosing the invention, it is to be understood that the invention is not limited to the particular embodiment so described and illustrated but that such changes in the size, shape and arrangement of the various parts may be resorted to as come within the scope of the sub-joined claims.

Having now described the invention so that others skilled in the art may clearly understand the same, what it is desired to secure by Letters Patent is as follows:

1. A flexible engine mount comprising a member secured to an engine to be supported and a member secured to a support for said engine, one of said members comprising a housing, the other of said members comprising a core member having a head adapted for reception within said housing, a resilient member interposed between opposed surfaces of said head and said housing, said core member having a stem bearing a shoulder, an externally flanged sleeve telescopically receiving said stem and in assembled condition abutting said shoulder, a plate carrying a Coulomb friction member for engagement with a surface provided by said housing, a normally dished spring having a substantially constant force range of deflections in its substantially flattened condition, means assembling said mount to press said spring, plate and friction member between the flange of said sleeve and the latter said housing surface so that said spring assumes its substantially flattened condition simultaneously with the abutment of said sleeve against said shoulder.

2. A flexible engine mount comprising a member secured to an engine to be supported and a member secured to a support for said engine, one of said members comprising a housing, the other of said members comprising a core member having a head adapted for reception within said housing, a resilient member interposed between opposed surfaces of said head and said housing, said core member having a stem providing a stop element, a socket receiving said stem and providing an abutment for said stop element in assembled condition, a plate carrying a Coulomb friction member for engagement with a surface provided by said housing, a normally dished spring having a substantially constant force range of deflections in its substantially flattened condition, means assembling said mount to press said spring, plate and friction member between the said socket and the latter said housing surface so that said spring assumes its substantially flattened condition simultaneously with the engagement of said stop element against said abutment.

JOHN M. TYLER.